United States Patent
Yamazaki et al.

(10) Patent No.: US 6,922,420 B2
(45) Date of Patent: Jul. 26, 2005

(54) METHOD OF CONTROLLING HARDENING WITH LASER BEAM AND LASER BEAM HARDENING DEVICE

(75) Inventors: Tsunehiko Yamazaki, Aichi-ken (JP); Naoomi Miyagawa, Gifu-ken (JP); Toshihiko Inoue, Aichi-ken (JP); Toshihiko Asari, Aichi-ken (JP); Masaaru Matsumura, Oosaka-fu (JP)

(73) Assignee: Yamazaki Mazak Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 10/280,385

(22) Filed: Oct. 25, 2002

(65) Prior Publication Data

US 2003/0080098 A1 May 1, 2003

(30) Foreign Application Priority Data

Oct. 30, 2001 (JP) ........................................ 2001-332993
Dec. 13, 2001 (JP) ........................................ 2001-379381

(51) Int. Cl.$^7$ ................................................ H01S 3/10
(52) U.S. Cl. .................... 372/25; 372/22; 372/29.014
(58) Field of Search ............................. 372/29.014, 25, 372/22; 427/554–559

(56) References Cited

U.S. PATENT DOCUMENTS

| 4,539,461 | A | | 9/1985 | Benedict et al. ............ 148/565 |
|---|---|---|---|---|
| 5,196,672 | A | | 3/1993 | Matsuyama et al. ... 219/121.83 |
| 5,463,202 | A | * | 10/1995 | Kurosawa et al. ..... 219/121.83 |
| 5,500,502 | A | | 3/1996 | Horita et al. .......... 219/121.63 |
| 5,530,221 | A | * | 6/1996 | Benda et al. .......... 219/121.83 |
| 5,698,120 | A | * | 12/1997 | Kurosawa et al. ..... 219/121.62 |
| 6,217,695 | B1 | * | 4/2001 | Goldberg et al. ............ 427/554 |
| 6,274,206 | B1 | * | 8/2001 | Turchan et al. ............. 427/554 |

FOREIGN PATENT DOCUMENTS

EP  0 822 027 A  2/1998

* cited by examiner

Primary Examiner—MinSun Oh Harvey
Assistant Examiner—Cornelius H. Jackson
(74) Attorney, Agent, or Firm—Duane Morris LLP

(57) ABSTRACT

A workpiece is irradiated by a laser beam scanned in an oscillating track as the workpiece is advanced along a feed path in a hardening process. Sinusoidal variations in scan velocity are offset by decreasing the laser beam power level at phases in the scanning cycles corresponding to high and low scan displacement peaks, where the scan velocity is least. The beam power is increased near the scanning center line where the scan velocity is highest. The beam energy applied per unit of area is thus equalized over the scanning cycle. The workpiece temperature can be sampled at regular phases by a non-contact temperature sensor in the optical path, and used to control beam power versus phase in a subsequent scanning cycle. Alternatively or in addition, a sinusoidal beam power pattern can be stored and used to offset scan velocity variations as a function of phase.

16 Claims, 6 Drawing Sheets

METHOD OF CONTROLLING HARDENING WITH LASER BEAM AND LASER BEAM HARDENING DEVICE

BACKGROUND OF THE INVENTION

This invention relates to a method of controlling material hardening using a laser beam, and the associated laser beam hardening device. The inventive method and device are capable of correctly measuring and controlling the temperature of a portion of material to be hardened, while scanning the laser over the material in an oscillating motion, and controlling the laser output power level from one hardening cycle to a next.

A method of hardening workpiece along a path with a predetermined width, by spatially oscillating the laser beam in a direction intersecting a feeding direction has been recently proposed. It is necessary correctly to detect the temperature of a portion to be hardened and to control the temperature of the portion to obtain proper hardening.

Such temperature control is not conventionally executed in a laser beam hardening device. It is possible to envision a method of measuring the temperature of a portion of material to be hardened, by non-contact temperature sensing using an infrared sensor or the like. But it is difficult using such a sensor to trail the point at which the laser energy is applied. The method is not practical because the torch device for applying the laser beam energy has a complicated track along which the laser beam is oscillated spatially, namely scanning at least partly lateral to the feeding direction or path along which hardening is to proceed, over a length and width as well as to some three-dimensional hardening depth.

When hardening workpiece by oscillating the laser beam spatially (feeding along a path while scanning the beam at least partly laterally of the feeding direction), the velocity of the laser beam over the material surface differs, resulting in differences in the amount of energy applied per unit area. A workpiece might be hardened by radiation for a given time over some arbitrary width of scanning amplitude and feed rate, with corresponding variation in the area to which the beam energy was applied. Greater coverage area requires greater beam power to achieve the same applied radiation per unit of material area, if the feed and scanning amplitude are constant, and the laser beam power output is constant, the radiation energy per unit area of material still is not constant because of periodic variations in the scan velocity. The radiation applied per unit area may be too high at phase positions where the relative velocity of the beam is low, as to melt the workpiece locally. On the other hand, the radiation energy per unit area may be too low at positions where the relative velocity of the beam is high, as to fail to raise the temperature of the workpiece to the level desired for hardening. Proper hardening is not possible unless the beam power and the scan velocity together achieve the desired material temperature.

A method and device for controlling hardening with a laser beam are needed, capable of properly controlling the radiation beam energy level applied by the laser beam, in coordination with the scanning amplitude of the laser beam, so as to obtain a proper hardening action.

Additionally, the laser beam hardening device should be capable of correctly measuring the temperature of the material portion being hardened, even if the laser or torch moved in a complicated scanning action as mentioned above, and controlling the temperature of the portion is desired to be provided.

SUMMARY OF THE INVENTION

According to one aspect, the invention provides a method of controlling hardening with a laser beam by irradiating a workpiece with the beam.

Irradiating the workpiece with the beam includes oscillating or scanning the beam on a track having a predetermined amplitude in a direction at least partly lateral to a feed path, so as to heat the workpiece over a predetermined area of hardening using the scanning laser beam.

The laser beam output power is controlled such that the laser beam output power near the peaks of the scanning pattern (for example, times (1), (5), (6), and (10) in FIG. 4 is made lower than the beam output power near a center line of the scanning pattern (for example, times (3), (4), (7) and (8) in FIG. 4).

Accordingly, the laser beam output power is lower at the scanning peaks, where the relative velocity of the laser beam over the surface of the workpiece is relatively lower, as compared to the laser beam output power near the center line, where the beam output power and the scan velocity are higher. This tends to equalize the applied energy per unit of area and to improve hardening.

An aspect of the invention is to control the laser beam output power so that when hardening a workpiece, a more uniform predetermined hardening temperature can be obtained over all the portions of the workpiece to be hardened.

According to this, the laser beam output can be adjusted to control the hardening temperature so as to obtain the predetermined hardening temperature over all the portions to be hardened.

The hardening temperature of the workpiece can be measured by acquiring laser light reflected from the workpiece while the workpiece is irradiated with the laser beam.

By obtaining temperature information from the reflected light of the laser beam irradiating the workpiece, the temperature of the portion being hardened is accurately determined. Proper hardening is possible.

A predetermined laser beam output scanning pattern and feed is prepared, for hardening a given area. Based on this pattern, the laser beam output power is controlled. As stated above, the laser beam output power at the scanning amplitude peaks, namely at the opposite end portions of the oscillating scan pattern, is controlled to a lower beam power than at the center portion of said beam scan pattern, where the beam power is made higher.

By coordinating the beam output power to the position along the oscillating scanning pattern, namely to use a lower beam output power at the peaks or end portions of the scan than at the center portion, the resulting temperature of the area to be hardened can be more easily controlled without the need for complex feedback control. Nevertheless, proper hardening is possible.

The invention encompasses both a method and a corresponding apparatus for hardening by irradiating with a laser beam.

The method can include establishing a hardening cycle wherein an at least partly laterally oscillating track is followed by a laser beam when irradiating the workpiece, and relatively feeding the beam or workpiece on a path. The oscillating laser beam track preferably has a predetermined amplitude and follows two or more cycles.

The temperature of a portion of the workpiece to be hardened can be determined at a given time and phase position in a scan cycle (such as time (1) of cycle 0 shown in FIG. 4). The laser beam output power in a subsequent cycle (such as cycle m shown in FIG. 4) can then be adjusted as necessary to correct for any error between the temperature detected and a desired temperature for hardening.

This procedure can be used to adjust the density of laser beam energy applied, to better obtain uniform energy density during the subsequent scan cycle by correcting for differences from desired temperature levels detected in the previous cycle.

The foregoing procedure of applying a beam power during a subsequent cycle (e.g., cycle m in FIG. 4) to correct for error in the detected temperature of a corresponding previous cycle (cycle 0), allows the laser beam output power to be properly adjusted even if an extremely high speed laser scanning cycle is used. The hardening method is highly effective.

According to another aspect, the specific point in time for which the laser beam output is adjusted during the subsequent hardening scan cycle (time (1') of cycle m in FIG. 4, for instance) is at the same phase position in the hardening scan cycle as the point in time when the temperature of the workpiece hardening portion is detected (time (1) of cycle 0 of hardening cycle of FIG. 4, for instance).

By measuring temperatures and controlling for beam output power at one or more corresponding phase positions in the scanning cycles, the laser beam output power applied to the portion to be hardened, can be adjusted precisely to reflect and possibly correct for the expected temperature based on the temperature conditions of at the same phase position(s) in the previous hardening scan cycle, which accurate results.

The invention also encompasses the device operable as described. The device can include:

a laser beam generator;

a guide apparatus for guiding the laser beam obtained from the laser beam generator;

a condensing lens at the guide means for collecting the laser beam and applying the laser beam to irradiate a portion of a workpiece to be hardened;

a beam oscillating means for oscillating said laser beam with a predetermined scanning amplitude; and a laser beam output power control for controlling the output power of the laser beam, so that the laser beam output power at the scanning peaks or end portions of said scanning amplitude is at a lower power level than at a center portion of said scanning amplitude, where the beam power level is higher.

The invention entails a laser beam workpiece hardening device, comprising:

a laser beam generator;

a guide means for guiding the laser beam obtained from said laser beam generator;

a condensing lens located at said guide means for collecting said laser beam and applying said laser beam to irradiate a portion of a workpiece, which portion is to be hardened;

a beam scanning means for scanning said laser beam in an oscillating scan patter having a predetermined scan amplitude;

a temperature detector for detector for detecting a temperature of said portion to be hardened;

a target laser beam output computing means for computing a target laser beam output power so as to determine a beam output power as a function of an error between the temperature detected by the temperature detector and a predetermined hardening temperature, the output power and the error being determined as of some point in time in a beam scanning cycle; and a laser beam output controlling means for adjusting said laser beam output power on the basis of the beam output power computed by the target laser beam output computing means, and wherein the laser beam output power is adjusted for a subsequent scanning cycle based on the error determined for a previous scanning cycle.

According to another aspect, the laser beam hardening device can comprise:

a laser beam generator;

a guide means for guiding the laser beam obtained from the laser beam generator;

a condensing lens located at said guide means for collecting said laser beam and directing said laser beam to a portion of a workpiece to be hardened by laser irradiation;

a beam splitter provided in said guide means between said laser beam generator and said condensing lens, the beam splitter separating a quantity of light that is reflected from said portion to be hardened; and a temperature measuring means provided at said beam splitter for measuring the temperature of said portion to be hardened, based on the reflected light separated by the beam splitter.

The temperature of the material portion being hardened is measured from reflected light captured by a beam splitter associated with the beam generator. In this way, the reflected light from the portion to be hardened is captured and the temperature is correctly determined even though the condensing lens and the workpiece may be moved relative to one another in one way or another. This technique provides accurate temperature measurement without the need for an additional complex mechanism.

The oscillating beam scanning means that scans the laser beam over a path having a predetermined width, is provided between said beam splitter and said condensing lens.

By placing the oscillating beam scanning means between the beam splitter and the condensing lens, the beam splitter is located upstream of the oscillating beam scanning means. The reflected light used to determine temperature is captured correctly and the temperature can be determined accurately for various positions through which the laser beam is scanned.

The particular temperature measuring means employed can be an infrared thermometer.

An infrared thermometer can determine the material temperature using a simple non-contact technique. The temperature is measured by transmission of an infrared light wave from the workpiece.

The condensing lens provided as described can be relatively movable and drivable in three dimensions with respect to said workpiece. Combining scanning and relative displacement permits the beam to be applied over the area to be hardened.

The beam splitter for separating the reflected light used by the temperature measuring means can be provided in the beam guide means. Thus, although the condensing lens can be relatively movable and drivable with three degrees of freedom, the temperature of the portion of the workpiece being hardened can be correctly measured.

DESCRIPTION OF THE PREFERRED EMBODIMENTS

Embodiments of the invention are explained hereinafter with reference to the accompanying drawings.

Figure 1:
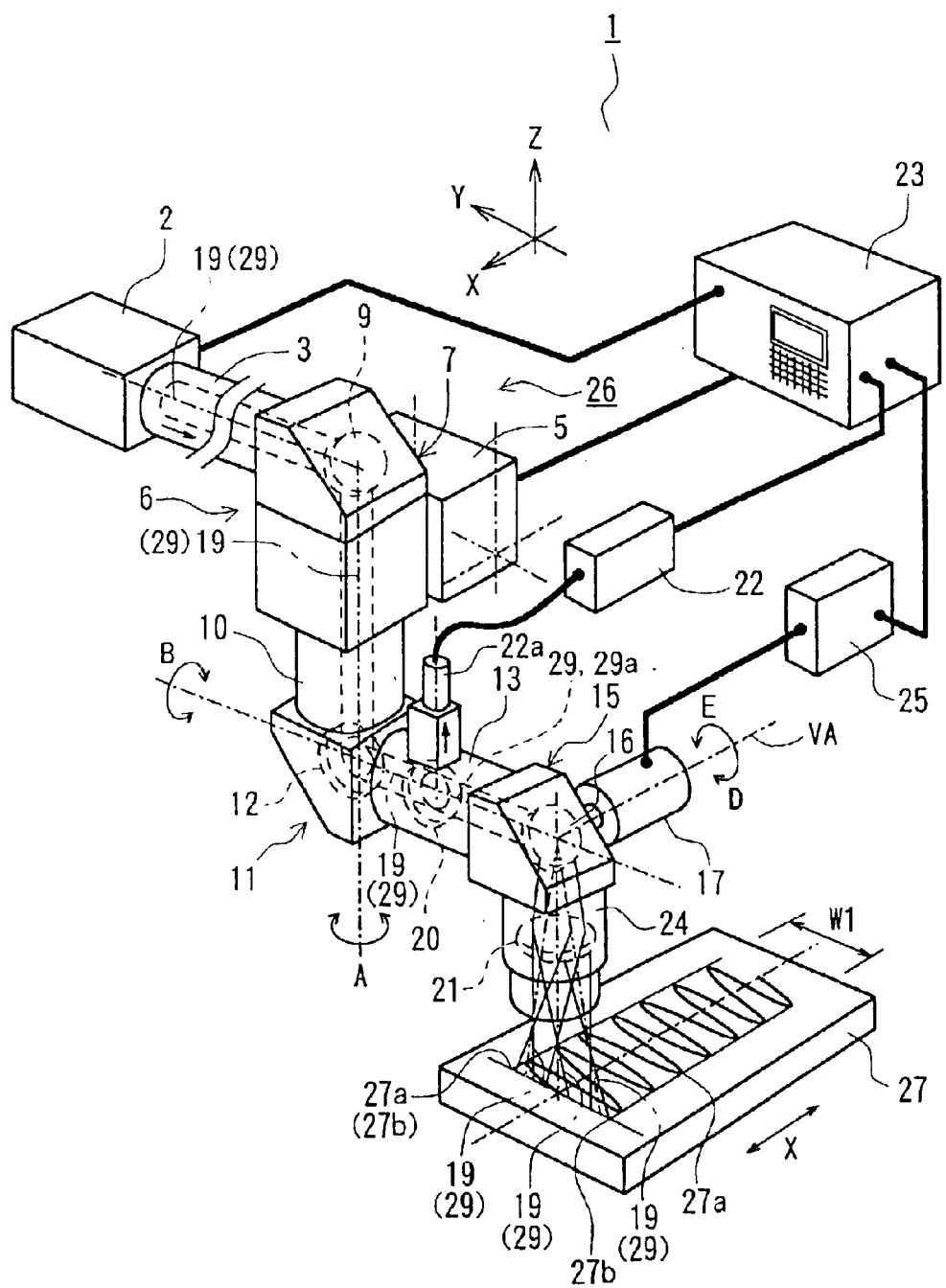
FIG. 1 is a schematic perspective view showing parts of a laser beam hardening device to which the invention is applied.
Figure 2:
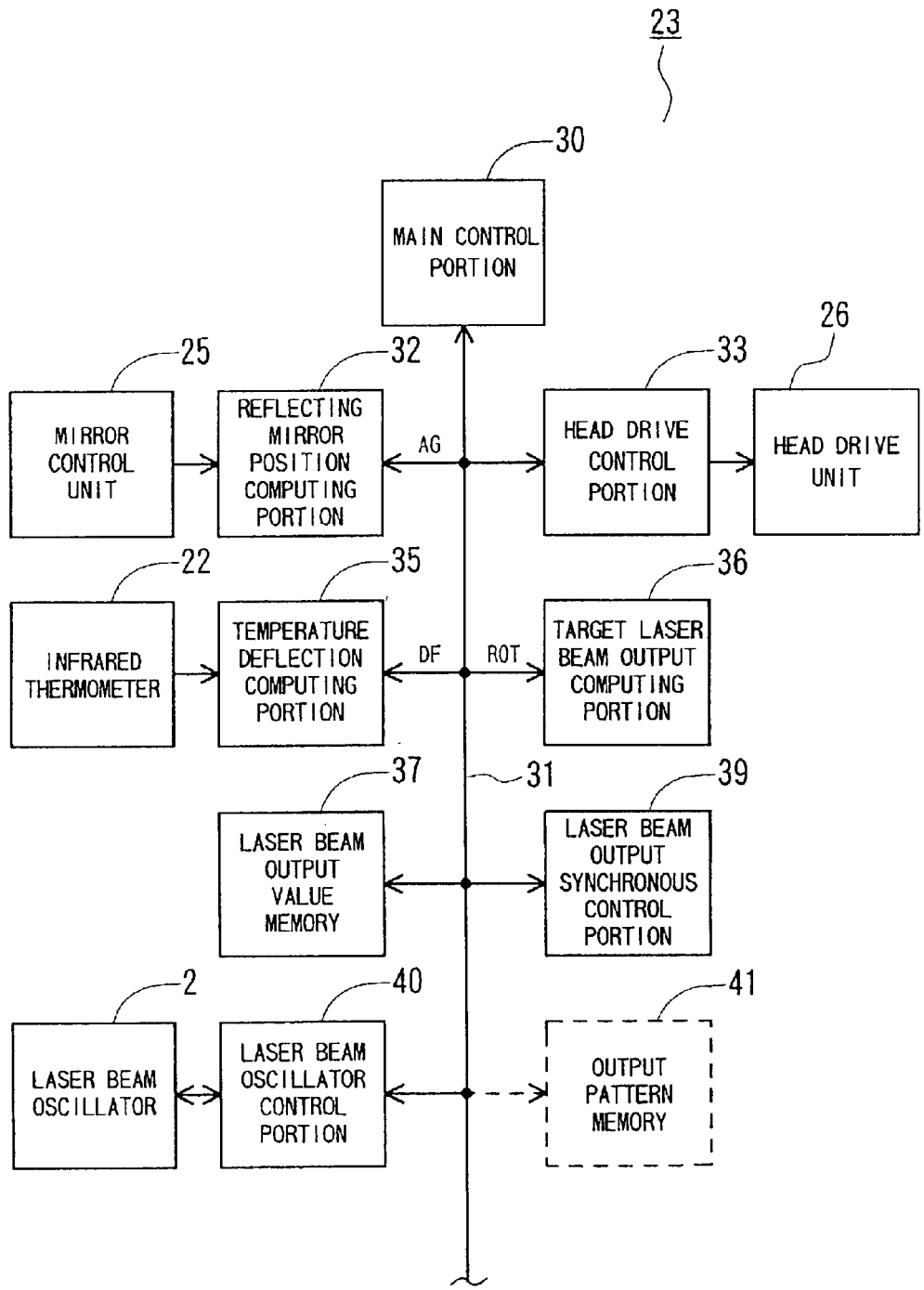
FIG. 2 is a block diagram showing elements of a NC unit employing the invention.
Figure 3:
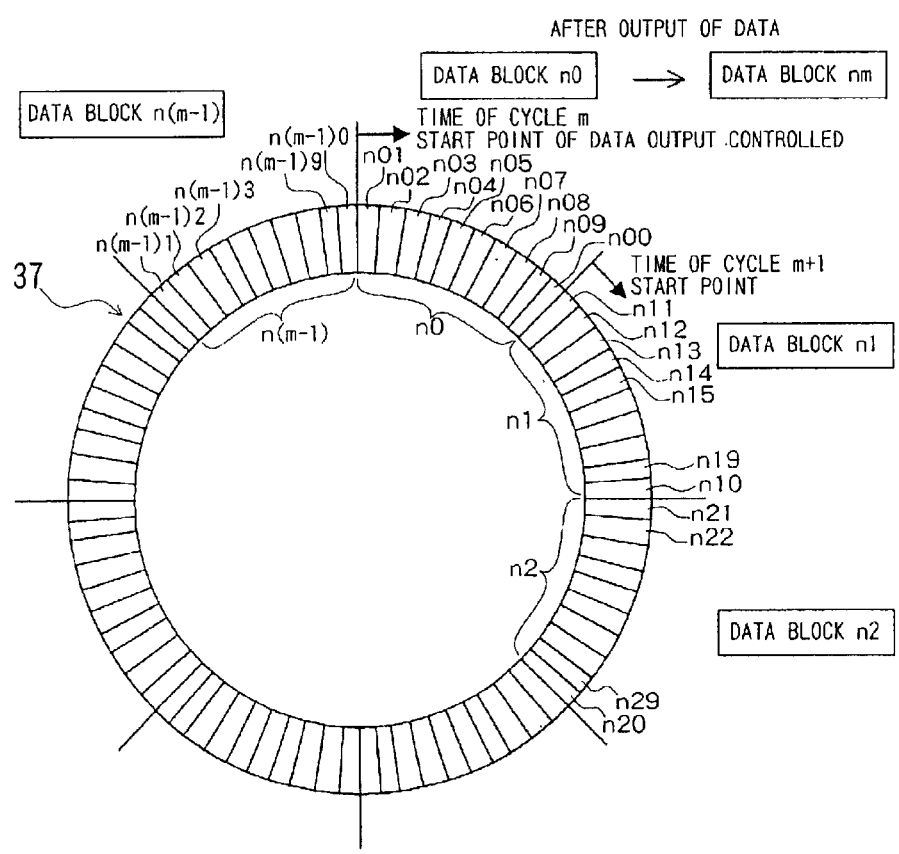
FIG. 3 represents a repetitive data memory for storing laser beam output values, schematically shown as a circular array of values.
Figure 4:
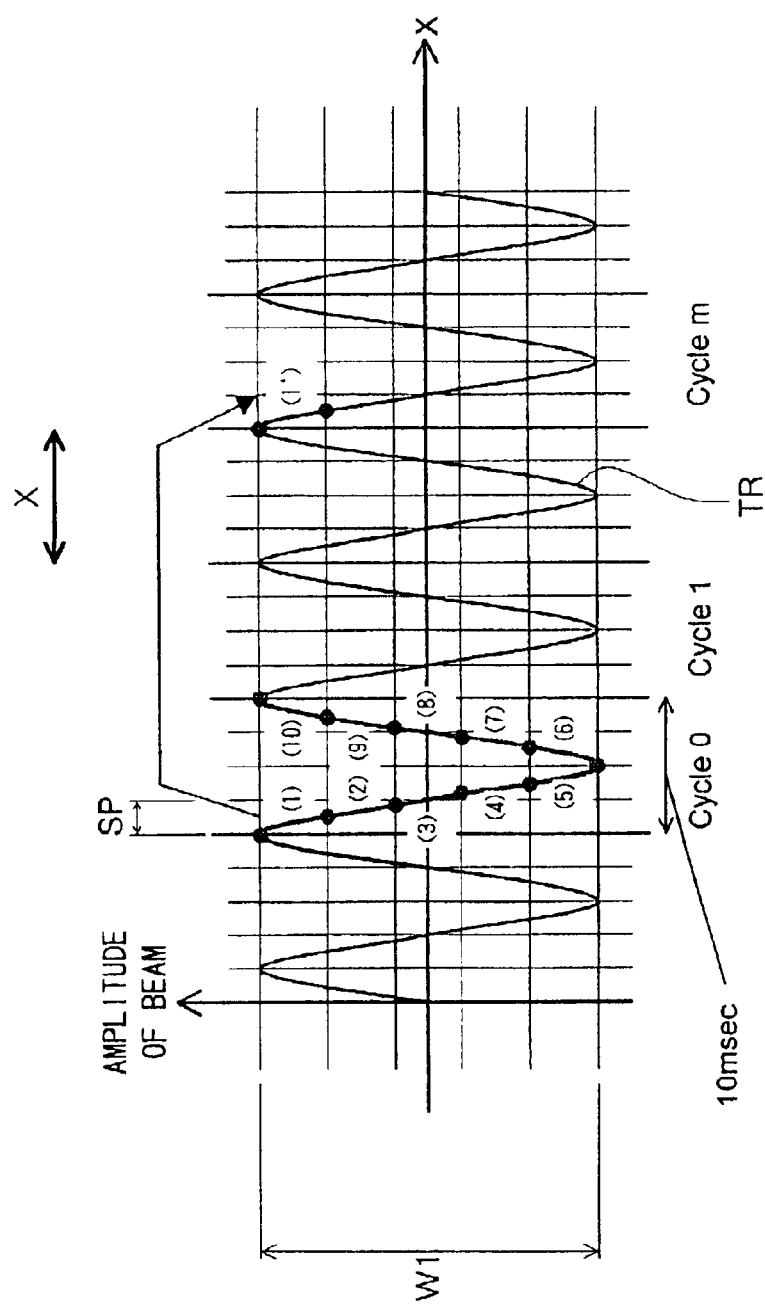
FIG. 4 is a view showing an oscillating hardening track of a laser beam for scanning over a width W1 along a path X.
Figure 5:
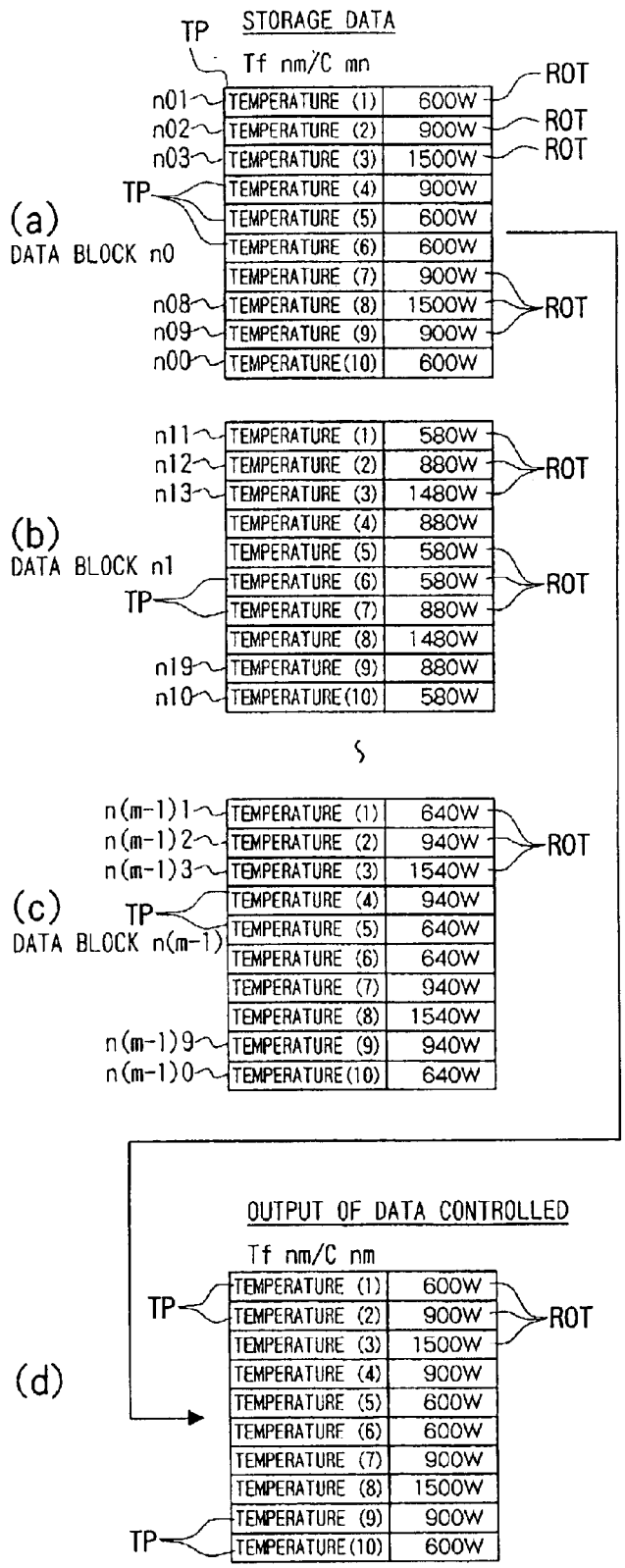
FIG. 5 is a schematic view showing contents of data blocks in laser beam output value memory.
Figure 6:
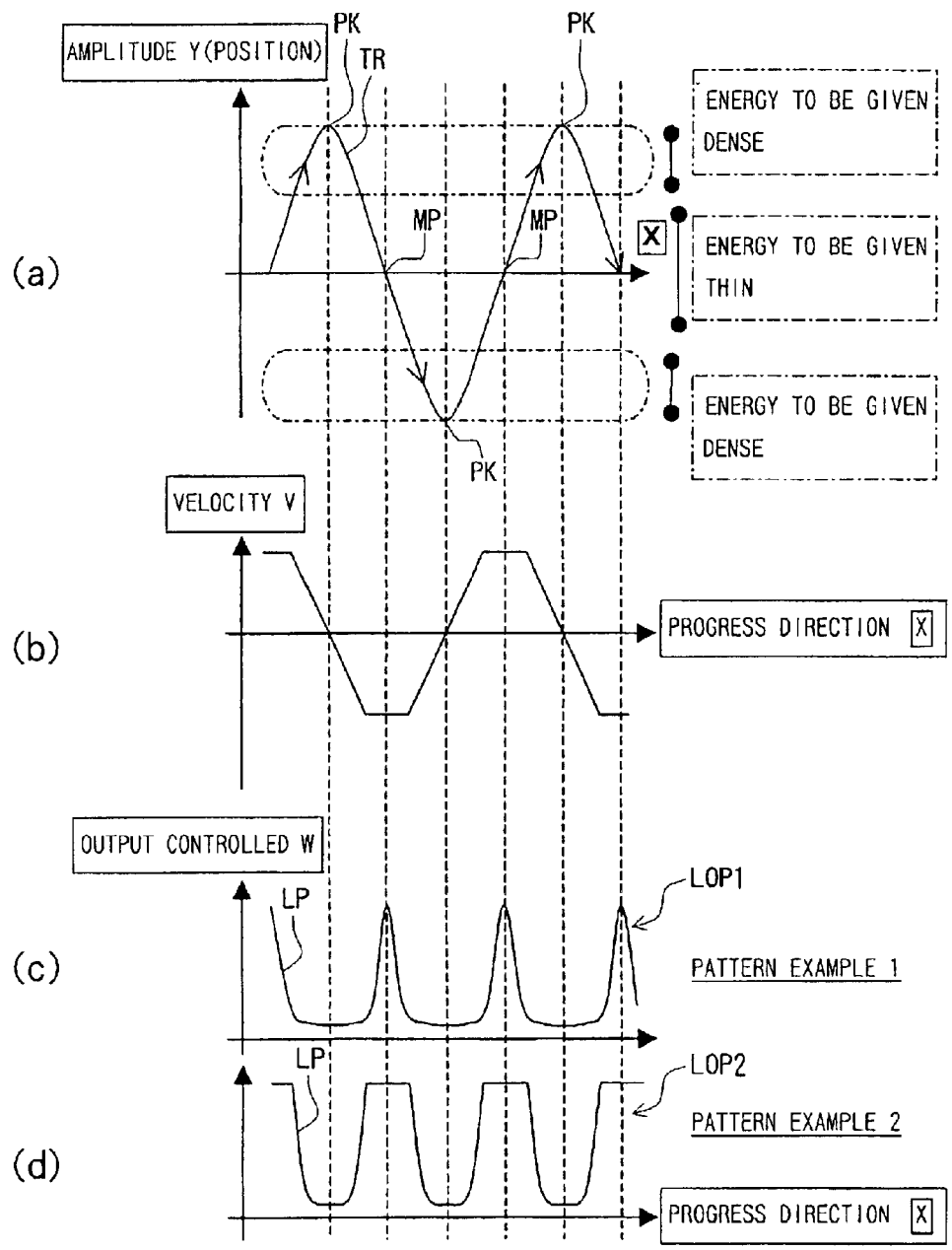
FIG. 6 is a set of corresponding time plots wherein chart (a) shows the track of laser beam (through one full hardening scan cycle); (b) shows plots the scan velocity of the beam along the workpiece surface and corresponds to chart (a); 6(c) is a plot of an exemplary variation in laser beam output power in a pattern corresponding to (a), and 6(d) is a plot showing another example of varying laser beam output power corresponding to (a).

FIG. 1 is a schematic perspective view showing elements of a laser beam hardening device to which the present invention is applied. FIG. 2 is a block diagram for showing important portions and connections in a numerical-control (NC) version of the unit. FIG. 3 is a schematic view demonstrating a re-circulating laser beam output value memory. FIG. 4 shows an oscillating scanning track over which the laser beam is passed to harden an associated area. FIG. 5 is a schematic view for showing contents of respective data blocks in a laser beam output value memory. FIG. 6 is a series of corresponding time plots wherein (a) shows the scanning track of the laser beam (a full hardening cycle); (b) shows the scan velocity of the laser beam over the workpiece, corresponding to (a); (c) illustrates an exemplary varying laser beam output power pattern for the scan in (a); and (d) shows an alternative example of a laser beam output power pattern corresponding to (a).

A laser beam hardening device 1 has a laser beam generator 2, as shown in FIG. 1, and a saddle 5 is connected with the laser beam generator 2 through a duct 3. The length of duct 3 is changeable. The saddle 5 is free to move and drive in a Y-axis direction, which can be a horizontal direction, through a guide means (not shown) such as a column. The saddle 5 is provided with a hardening head 7. The hardening head 7 has an upper reflection barrel 6 fixedly provided at the saddle 5.

The upper reflection barrel 6 comprises a first reflecting mirror 9. The upper reflection barrel 6 is provided with a duct 10. Duct 10 is free to extend, for positioning in a Z-axis direction, which is the up/down direction in the exemplary orientation shown. The upper reflection barrel 6 is free to rotate, drive and position relative to an A-axis direction with the Z-axis as its center. On the lower end of the duct 10 in the figure, a lower reflection barrel 11 is provided. The lower reflection barrel 11 is provided with a second reflecting mirror 12.

The lower reflection barrel 11 has a duct 13, extending in a horizontal direction, and a side reflection barrel 15 is provided at a top end of duct 13. The side reflection barrel 15 is provided with a third reflecting mirror 16. A mirror oscillating unit 17 is connected with the third reflecting mirror 16, and is free to move the third reflecting mirror 16 in a direction as shown by arrows D and E, with an oscillating axis VA perpendicular to a laser beam optical path 19 between the second reflecting mirror 12 and the third reflecting mirror 16 as its center. This provides an oscillating scanning motion for the optics, having a scanning amplitude W1. With relative displacement of the workpiece and/or device in direction X, the scanning can encompass an area of the workpiece 27. A beam splitter 20 is provided in the laser beam optical path 19. In this embodiment being in the duct 13 between the third reflecting mirror 16 and the second reflecting mirror 12. Furthermore, a condensing lens 21 is provided at the lower portion of the side reflection barrel 15 through a torch 24, or head, installed on the lower portion of the side reflection barrel 15.

An infrared thermometer 22 is connected with the beam splitter 20 through a pickup 22a, and a NC unit 23 is connected with the infrared thermometer 22. A mirror control portion 25, connected with the above-mentioned mirror oscillating unit 17, is connected with the NC unit 23. Furthermore, the NC unit 23 is connected with a head drive unit 26 for driving the hardening head 7 and the laser beam scanning oscillator 2.

The functional elements are shown schematically in FIG. 2. The NC unit 23 has a main control portion 30 coupled directly or indirectly to the other elements. A reflecting mirror position computing portion 32 is connected with a mirror control unit 25. A head drive control portion 33 is connected with the head drive unit 26. A temperature deflection computing portion 35 is connected with an infrared thermometer 22. A target laser beam output computing portion 36, a laser beam output value memory 37, a laser beam output synchronous control portion 39 and a laser beam oscillator control portion 40 connected with the laser beam oscillator 2 are connected through a bus line 31. These elements operate to achieve the functions stated in their titles.

A workpiece 27 is to be hardened using a laser hardening device 1 with the above-mentioned structure. The workpiece 27 is located on a workpiece table (not shown) to place the workpiece below torch 24 in the orientation shown in FIG. 1. A hardening procedure is to be undertaken to effect a hardening program having parameters that are determined in advance as to one or more of temperature, beam power, scanning amplitude and rate, linear feed, etc., as the workpiece 27 to be hardened is processed through the NC unit 23.

The NC unit 23 drives a table (not shown) so as to move and drive the workpiece 27 in the X-axis direction which is a horizontal direction in the view of FIG. 1, orthogonal to the Y-axis. NC unit 23 also drives the head drive unit 26 so as to move and drive the hardening head 7 including the torch 24 in the Y-axis direction and Z-axis direction and so as to properly rotate and drive the lower reflection barrel 11 in the direction as shown by the arrow A together with the side reflection barrel 15, and so as to properly rotate and drive the side reflection barrel 15 in the direction as shown by the arrow B. Thus, torch 24 is faced to a portion of workpiece 27 to be hardened, and driven to scan over an area in successive cycles.

The NC unit 23 controls or instructs the laser beam generator 2 to produce an output beam 29 having a predetermined output beam power. The laser beam generator 2 injects the laser beam 29 along an optical path to first reflecting mirror 9 through duct 3, and is reflected (downwardly as shown) by the first reflecting mirror 9. The beam is further reflected in a horizontal direction by the second reflecting mirror, and passes through the beam splitter 20 so as to enter in the third reflecting mirror 16.

The laser beam 29 incident on the third reflecting mirror is reflected (downwardly in the orientation shown), in the direction of the workpiece 27. The beam is collected by the condensing lens 21, which aims the beam toward the workpiece 27. When the beam reaches a given point on workpiece 27, the material of workpiece 27 is suddenly locally heated according to the intensity of the incident beam. This heating hardens the workpiece material at the point. The point of application is scanned and moved so as to harden the material over a surface.

The workpiece 27 is fed in the direction of arrow X by a driving mechanism (not shown) responsive to the NC unit 23, at a predetermined feed velocity. The NC unit 23 also drives the mirror oscillating unit 17 through the mirror control unit 25, for scanning the beam over a width W1 of material to be hardened. This scanning oscillation, as determined from the program of NC unit 23, involves vibrating the third reflecting mirror 16 in the direction as shown by the arrows D and E. This causes laser beam 29, incident on third reflecting mirror 16, to be scanned in an oscillating pattern over width W1 in a direction (the Y-axis direction) orthogonal to the direction (the X-axis direction) that is the direction of feeding workpiece 27. Workpiece 27 is heated within the scanning amplitude bounds of the width W1 by the scanning laser beam 29 up to a temperature determined by the beam power and rate. As thus described, the direction of relative movement of the workpiece 27 relative to the torch 24 is simply a linear advance in the X-axis direction. This movement is but an example for simplifying the description and does not exclude other more complicated motions. The applicable control axis or movement direction that positions the torch 24 with respect to the workpiece 27 is the A-axis which is a rotation axis around the X-axis and the B-axis which is a rotation axis around the Y-axis, in each case assuming alignment to mutually orthogonal X, Y and Z axes. The control axes are carried successively on one another. Therefore, in addition to the X, Y and Z control axes that are orthogonal to each other, other optional three-dimensional positioning motions are possible with respect to the workpiece 27, in various directions of the three-dimensional space is available when hardening the workpiece 27.

It is desirable correctly to measure a temperature of a portion 27a to be hardened on workpiece 27. Proper hardening requires heating the portion 27a to a predetermined hardening temperature. The temperature of the portion to be hardened 27a is measured by infrared thermometer 22. The infrared radiation measured by the infrared thermometer 22 is the infrared band of reflected light 29a from an aiming portion 27b on which the laser beam 29 is presently aimed. The reflected light 29a is incident on the beam splitter 20 through the condensing lens 21 and the third reflecting mirror 16 from the aiming portion 27a of the workpiece 27, backwards along the optical path. The light from the aim point is reflected upwardly as shown in the figure by the beam splitter 20 and is applied to the pickup 22a of the infrared thermometer. In this manner the temperature at the aiming point is obtained.

The infrared thermometer 22 can measure the temperature of the portion 27a to be hardened, while such hardening is proceeding due to irradiation from laser beam 29. Thus the temperature pickup 22a can collect temperature information in real time. The beam splitter 20 that provides reflected light 29a to the pickup 22a is located on the optical path between the laser beam generator 2 and the third reflecting mirror 16, which is the beam oscillating reflection mirror causing the beam 29 to be aimed in an oscillating scan pattern. In this embodiment, the beam splitter 20 is not located on the condensing lens 21 side, downstream of the third reflecting mirror 16 that scans the laser beam 29. Therefore, the reflecting light 29a providing temperature sense information from the workpiece 27 is returned to the third reflecting mirror 16 through the condensing lens 21, tracking the same path but in an opposite direction, as the laser beam path, namely from the aim point on the portion 27a to be hardened on workpiece 27, back to beam splitter 20. In this way, pickup 22a captures reflected light 29a from the portion 27a to be hardened, correctly sensing the temperature of that specific portion 27a, without additional structure. It is desirable to locate beam splitter 20 on the third reflecting mirror 16 side, which is the beam oscillating reflection mirror, if possible, taking any attenuation of the reflected light 29a into consideration.

This temperature measurement along the reverse optical path functions however the torch or head 24 may be moved and oriented. The torch 24 can be moved and driven over five-axes of control as described above, so as to take various postures with respect to the workpiece 27. The infrared thermometer 22 can capture the temperature of the portion 27a to be hardened, through the beam splitter 20, through any change in the posture of the torch 24.

In case of a hardening device otherwise described but without a beam oscillating reflection mirror as the means for scanning the laser beam 29, the beam splitter 20 may be located at any position between the condensing lens 21 and the laser beam generator 2. It is desirable that the beam splitter 20 is located on the condensing lens 21 side, if possible, taking the attenuation of the reflecting mirror 29a into consideration.

After the temperature of the portion 27a to be hardened is measured by the infrared thermometer 22, the NC unit can determine whether or not the temperature is brought to the hardening temperature set by the hardening program. The NC unit controls the parameters to adjust the output power of the laser beam generator 2 (and optionally other controlled parameters) so that the temperature of the portion 27a to be hardened can become the hardening temperature determined by the hardening program, as described hereinafter.

In addition to adjusting the output power to achieve the desired hardening temperature, control of the hardening temperature may be possible by adjusting the feeding velocity of the workpiece 27 or adjusting the vibrating cycle of the laser beam by the mirror oscillating unit 17.

The foregoing embodiment refers to using beam splitter 20 to pass the laser beam from the laser beam generator 2 and to pass the reflected temperature sensing light 29a from the portion 27a to be hardened. Other reflecting and beam splitter arrangements are also possible.

Also, other thermometer arrangements may be used for measuring the temperature of the portion 27a being hardened, in lieu of infrared thermometer 22. However it is desirable that the temperature of the portion to be hardened 27a be determined from a parameter of the reflected light 29a.

As shown in FIG. 4, the action of hardening the workpiece 27 with the laser beam 29 is executed over an area of scanning having a width or scanning amplitude W1. The track TR of the laser beam 29 on the workpiece 27 approximates a sine wave. The vibration amplitude can be W1/2 since the laser beam 29 is scanned or driven in the direction shown by the arrows D and E perpendicular to the direction of feeding the workpiece 27 by the third reflecting mirror 16. The workpiece 27 is fed relative to the torch 24 at a predetermined feeding velocity in the X-axis direction, which together with the mirror vibration rate determines the spatial period of the track TR.

Due to the sinusoidal form of track TR, the relative velocity V of the point of incidence of laser beam 29, moving over the workpiece along track TR (i.e., the linear scan velocity) also varies sinusoidally. The linear speed or scan velocity is shown in FIG. 6(*b*). If the feeding speed is not considered, the scan velocity V of the laser beam 29 becomes zero when the track TR reaches a peak PK of its vibration amplitude and changes direction. The scan velocity V is at its maximum at the position near a median MP of the amplitude (along a center line of the path). If the laser beam 29 is scanned over the workpiece 27, maintaining a constant power output of the laser beam generator 2 and a constant feeding speed, the energy density of the laser beam irradiating the workpiece 27 per unit area is made higher near the peak PK of the amplitude, where the relative velocity V is slower, and is lower near the median MP, where the relative velocity V is faster. If the laser beam 29 irradiates the workpiece 27 so as to harden in the above-mentioned state, the hardening is uneven over the whole length of the track TR due to this variation in energy density over each cycle.

According to the invention, the NC unit 23 divides the oscillating scanning cycle of the third reflecting mirror 16 in the direction as shown by the arrows D and E, that is, the track TR of the laser beam, by increments of a predetermined sampling time SP, in FIG. 4. In an instance as shown in FIG. 4, one cycle of the track TR (the period of one full reciprocation of the third reflecting mirror 16) can be divided, for example, into ten parts. If one full scan oscillation or "hardening cycle" has a period of 10 ms, for instance, the NC unit 23 instructs the temperature correction computing portion 35 to obtain a temperature measurement TP of the portion 27*a* to be hardened on workpiece 27, every 1 ms. The temperature is measured at some such sampling interval by infrared thermometer 22, and associated with each sampling time SP. The sampling times SP fall at particular phase positions in the hardening cycle.

Hardening of the workpiece meanwhile continues. The laser beam is scanned at least partly laterally of the feed direction with a scanning amplitude, as the workpiece is fed (in the X-axis direction in FIG. 4). Two or more hardening cycle scans are repeated as the workpiece 27 is fed.

The temperature correction computing portion 35 computes an error or deflection DF between the measured temperature TP of the portion to be hardened 27*a* input from the infrared thermometer 22 for the sample points SP, and a determined hardening temperature TD, determined in advance by the hardening program, providing an output to the target laser beam output computing portion 36. The target laser beam output computing portion 36 computes whether and how much to change the output beam power level of the laser beam generator 2 (and/or other parameters) in order to obtain the desired hardening temperature at each sampled point as the operation continues. That is, beam output computing portion 36 makes changes to seek to maintain hardening temperature TD namely as a function of the error or deflection DF using target laser beam output ROT. The target laser beam output computing portion 36 stores the target laser beam output ROT thereby obtained and the measured temperature TP corresponding thereto together with other data showing the time or sample count of measuring temperature ((1) through (10) in the figure). This data is stored at a corresponding address of the data block n0 of the laser beam output value memory 37, as shown in FIG. 5(*a*).

The measured temperature TP for sample time (1) and the target laser beam output ROT determined as above are stored in the address 01. The measured temperature TP or sample time (2) and the target laser beam output ROT at that time are stored in the address n02, and the measured temperature TP for sample time (3) and the target laser beam output ROT are stored in the address 03, etc. As a cycle concludes, the measured temperature TP of time (10) and the target laser beam output ROT for this time are stored in the address n00 in a similar way so as to store the measured temperature TP of the portion to be hardened 27*a* and the target laser beam output ROT for full cycle. In the example shown in FIG. 5(*a*), the measured temperature TP is stored at the portion on which "Temperature" is displayed of n0k (k: 1 through 9, 0). The numeral in parentheses at the right with respect to "Temperature" shows the sampling time, and the target laser beam output ROT is shown stored, as "600 W," for instance, on the further right.

By proceeding as described, the temperature of each portion to be hardened 27*a* and the laser beam target output for the corresponding phase position are stored. FIG. 4 shows the successive temperatures and target laser beam output values ROT for each sample time (1) through (10) over one full hardening cycle or scanning oscillation of the third reflecting mirror 16, shown as "Cycle 0" in FIG. 4.

For successive cycles, the NC unit 23 adjusts the output of the laser beam generator 2 to set the beam output power to the target output ROT for the corresponding phase position in the current cycle, based on the measured temperature versus the desired temperature in a previous cycle. The predetermined hardening temperature and the computed data determined by the hardening program concerning the temperature error from "cycle 0" stored in this way, are used to control the operation to make the measured temperature equal to a desired temperature as the operation continues. This causes the method and device to execute proper hardening on the workpiece 27 and can adapt to changing conditions, but a delay time may be necessary for the control to settle after starting, etc. Also, when commencing or changing operation, the control, scanning and feeding proceed for a time before measured temperatures TP and target laser beam outputs ROT are valid for the conditions. Startup may be arranged to adjust the output of the laser beam oscillator 2 immediately and the target laser beam output ROT may be computed immediately as a starting procedure, or else, as in the normal case, the new laser beam power output is determined from data collected at a corresponding phase position in a previous cycle or half cycle.

When starting or changing parameters using data from the next previous scanning cycle (or an earlier cycle), proper hardening action might be achieved only after the control settles. However, the main control portion 30 can have a technique to permit the laser beam output control portion 39 to execute target laser beam output ROT determined in another way. For example, the control can default to a nominal ROT or can control based on a measured temperature TP obtained at selected phase position in the same cycle instead of a previous cycle.

In steady ongoing operation, the main control portion 30 causes the laser beam output synchronous control portion 39 to set the present output power of the laser beam generator 2 on the basis of the measured temperature TP and target laser beam output ROT from an earlier cycle, if the earlier cycle is "cycle 0" in FIG. 4, the cycle currently controlled based on cycle 0 may be occurring "m" cycles later (where m is an integer of 1 or more), shown as "cycle m" in FIG. 4. Furthermore, the laser beam generator 2 is controlled so that the target laser beam output ROT that way obtained for each sampled point in time (1) through (10) over the phase of "cycle 0" is used for the same point in time (1') through (10'), namely corresponding in each case to the same phase position during cycle m as in cycle 0. The laser beam output synchronous control portion 39 controls the power output of laser beam generator 2, taking any delay time necessary for the control of the laser beam generator 2 into consideration. In any case, the temperature is controlled to seek the desired hardening temperature determined by the hardening program so as to obtain proper hardening action.

During any hardening cycles between cycle 0 to cycle m, the main control portion 30 computes the measured temperature TP of the portion to be hardened 27*a* and the target laser beam output ROT in the points of time (1) through (10) divided into ten of 1 ms in subsequent cycle 1, cycle 2 . . . cycle m−1 in a similar way as described above, to store data in the addresses of the corresponding data blocks of the laser beam output value memory 37 for use with respect to subsequent control.

For instance, the measured temperature TP and the target laser beam output ROT in each time (1) through (10) in cycle 1 subsequent to cycle 0 are respectively stored in the address n1k (k: 1 through 9, 0) of the data block n1 as shown in FIG. 5(*b*), and the measured temperature TP and the target laser beam output ROT in each time (1) through (10) in cycle m−1 just before cycle m are respectively stored in the address n (m−1) k (k: 1 through 9, 0) of the data block n (m−1) as shown in FIG. 5(*c*).

The schematic form of the data block in the laser beam output value memory 37 is that m numbers of data blocks from the data block 0 to the data block n (m−1) are annularly connected and located, as typically shown in FIG. 3. When the measured temperature TP and the target laser beam output ROT are finished to be stored in m numbers of the data blocks, the laser beam output synchronous control portion 39 collectively reads out the next (m+1)$^{th}$ data block, that is, the data of the data block n0 storing the data of cycle 0 so as to store the data in a proper buffer memory, as shown in FIG. 5(*d*).

In executing cycle m, the laser beam output synchronous control portion 39 reads out the target laser beam output ROT in the corresponding time out of the buffer memory as shown in FIG. 5(*d*) a predetermined time before the hardening cycle reaches each time of (1') through (10'), and instructs the laser beam oscillator control portion 40 to change the laser beam output at this time into the target laser beam output ROT. Receiving the instruction, the laser beam oscillator control portion 40 controls the laser beam output of the laser beam oscillator 2 so as to operate at the target laser beam output power ROT required at the time.

The laser beam output synchronous control portion 39 can be arranged to instruct the laser beam oscillator control portion 40 early to account for any response lag. The control portion 40 can set the output of the laser beam generator 2 as 600 W which is the target laser beam output ROT obtained in the time (1), for instance, a predetermined time before the output is needed at that level, for example, 5 ms before the hardening cycle reaches the time (1') of the cycle m which phase is the same as the time (1).

The corresponding target laser beam output power ROT for each time (2), (3), . . . (9), (10) of cycle 0 likewise is read out and used to control the laser beam output power level during cycle m, for instance, at a predetermined time before the laser beam 29 reaches the time (2'), (3'), . . . (9'), (10').

While executing the hardening cycle of cycle m, the temperature of the portion to be hardened 27*a* is measured and the target laser beam output ROT is computed for each sampling time (2') (3'), . . . (9'), (10') in cycle m as described. The results are newly stored in the data block n0 and collectively are read out at the time of executing hardening in a subsequent cycle that is occurs after another integer number of m cycles later. In this way the current cycle and the affected cycle progress around the laser beam power output value memory 37, shown in FIG. 5(*a*).

In the subsequent hardening cycles to be executed, the laser beam output is controlled on the basis of the measured temperature TP of the portion to be hardened 27*a* obtained in the previous hardening cycle occurring m cycles earlier. The target laser beam output ROT corresponding to the measured temperature TP are computed to affect the subsequent cycle occurring m cycles later. During each hardening cycle, the control seeks the desired hardening temperature at all phase positions, more closed approaching the designated hardening temperature every time the hardening cycle is repeated.

The scan velocity of the laser beam 29 is at its minimum in the peak or end portions of the scanning amplitude of the laser beam during the scanning cycle as shown in FIG. 6(*a*) and (*b*). At that point the density of laser energy applied to the workpiece 27 per unit area becomes high. This is also clear from the target laser beam output ROT of each time in each data block, where the laser beam output figure is lowest at sample or phase times (1), (5), (6), and (10) of each data block as shown in FIG. 5.

The scan velocity of the laser beam 29 is gradually higher in the center portion of the scanning amplitude of the laser beam of the hardening cycle and the scan velocity is highest near the position where the scan crosses the centerline (where the scan amplitude is zero. See FIG. 6(*b*).

For even hardening, the laser beam output is adjusted such that the laser beam output power level is increased with approaching the point where the scan amplitude is zero and the scan velocity is highest, e.g., phase times (1) or (6), and is decreased for the phase times (e.g., (5) or (10)) with the scan amplitude at a positive or negative peak and the scan velocity is at its lowest. This variation is also followed at phase times (2), (3), (4), (7), (8), (9) of the respective data blocks as shown in FIG. 5, to equalize the energy applied per unit area to the portion 27*a* of workpiece 27 that is to be hardened by laser scanning. The temperature is thereby equalized at the desired hardening temperature defined in the hardening program, and is maintained at the desired temperature as the hardening cycles continue and repeat.

In the foregoing embodiments, the target laser beam output ROT is computed on the basis of the measured temperature TP detected at the portion 27*a* to be hardened. The measured temperature is controlled to bring the measured temperature to the temperature defined by the hardening program, using the target laser beam output computing portion 36, and the temperature of the portion to be hardened 27*a* is controlled so as to become a predetermined hardening temperature in such a manner that the laser beam output of the laser beam generator 2 is set to the target laser beam output ROT during the corresponding phase portion of the later hardening cycle at least one cycle after the cycle on which the target laser beam output ROT was computed. This is a form of a feedback control wherein the control is distinct as to phase positions and applies from one cycle to the subsequent controlled cycle. However, an open loop control may be also possible according to the invention and can be used separately or together with the feedback control as described. The point is that the laser beam output power level at both end portions of the scan amplitude of the laser beam are controlled to be lower than the power level at portions of the scan amplitude near the scan center portion or center line of the predetermined width W1 of the portion 27a to be hardened.

In that case, the NC unit 23 can be provided with an output power level variation stored in a power output pattern memory 41 where the power level varies as a function of scan phase position as described. The power output pattern memory 41 is connected with bus line 31, as shown by a broken line of FIG. 2, and stores one or more output power variation patterns LOP1, LOP2 as a function of scanning phase. The laser beam output power level LP is made low at and near the upper and lower peaks of the scan amplitude of the laser beam track, that is, at both scanning extremes of the hardening cycle. The laser beam output power level LP is made high in the center portion as shown in FIG. 6(c) or FIG. 6(d) where the scan amplitude crosses the center line. The output power variation as a function of scan phase is stored in memory. A plurality of different laser output patterns LOP1 or LOP2 can be prepared and stored, e.g., according to the shape and material of a workpiece, and used selectively. When hardening given workpiece 27, the laser beam output pattern LOP1 or LOP2 is read out of the output pattern memory 41. The laser beam output synchronous control portion 39 adjusts the output of the laser beam obtained from laser beam generator 2 on the basis of the laser beam output pattern LOP1 or LOP2 according to the phase position where the third reflecting mirror oscillates scanning by control from the reflecting mirror position computing portion 32. In this way, the energy applied to the portion to be hardened is equalized over the portion of workpiece 27 that is scanned, providing uniform heating over the area and over all scanning phases and spatial scanning positions of the laser beam.

The invention has been explained on the basis of the embodiments set forth above. However, the embodiments which are described in the specification are illustrative and not limiting. The scope of the invention is designated by the accompanying claims and is not restricted by the foregoing descriptions of specific embodiments. All transformations and changes encompassed by the claims are to be considered within the scope of the invention claimed.

What is claimed is:

1. A method of controlling hardening of a workpiece with a laser beam, comprising:
    irradiating a workpiece with a laser beam, and moving the laser beam along an oscillating scanning track with a predetermined scanning cycle and scanning amplitude, thereby heating said workpiece over a length determined by a feed path and a width determined by an amplitude of the scanning track; and
    controlling a power output of said laser beam in such a manner that said power output of the laser beam over said scanning cycle is lower at both opposite scanning peaks of said oscillating scanning track, than said laser beam power output at a center portion of said oscillating scanning track;
    wherein said laser beam power output is adjusted to obtain a predetermined hardening temperature of said workpiece when heated by irradiating with said laser beam, at all portions of said workpiece to be hardened; and
    wherein said hardening temperature of said workpiece is measured by acquiring reflected light of said laser beam when irradiating said workpiece.

2. The method of controlling hardening with a laser beam of claim 1, further comprising defining and storing a pattern of laser beam output power variation as a function of scanning phase, wherein said controlling of the power output of said laser beam is responsive at least partly to the stored pattern, such that said laser beam power output is lower at both opposite scanning peaks of said oscillating scanning track, than said laser beam power output at the center portion of said oscillating track.

3. A method of controlling hardening with a laser beam when hardening a workpiece by irradiating the workpiece along a path using the laser beam, comprising:
    hardening the workpiece by irradiating the workpiece along a scanning track of said laser beam proceeding along a feed direction and oscillating laterally of the feed direction for hardening an area of said workpiece, wherein said laser beam is oscillated along the track over a predetermined scanning amplitude;
    executing at least two successive scanning cycles so as to harden said workpiece;
    detecting a temperature of a portion of the workpiece to be hardened during an earlier one of said at least two successive scanning cycles, and adjusting an output power of said laser beam during a subsequent one of said at least two scanning cycles, based on said temperature detected during the earlier one of the scanning cycles, said output power being adjusted for the subsequent cycle based on a difference between said detected temperature and a predetermined hardening temperature; and
    controlling a power output of said laser beam so as to apply equal power density to the workpiece over the width of the path during the subsequent cycle, and based on said difference.

4. The method of controlling hardening with laser beam of claim 3, wherein the temperature of the portion of the workpiece is detected in the earlier one of the scanning cycles as a function of phase position in the scanning track, and the power output of the laser beam is controlled during said subsequent cycle, so as to control the laser beam power output at a same phase position in the subsequent cycle as the phase position at which the temperature was detected in the earlier cycle.

5. A laser beam hardening device, comprising:
    a laser beam generator;
    a guide means for guiding a laser beam produced by said laser beam generator;
    a condensing lens located at said guide means for collecting said laser beam and applying said laser beam to a workpiece at a portion of the workpiece to be hardened;
    an oscillating beam scanning means for oscillating a track of said laser beam over said workpiece with a predetermined amplitude; and
    a laser beam output controlling means for varying a power output level of said laser beam generator while scanning, in such a manner that said laser beam power output level is higher at a center portion of the oscillating track of the laser beam than at opposite peak amplitudes of the oscillating track.

6. A laser beam hardening device, comprising:
    a laser beam generator;
    a guide means for guiding a laser beam produced by said laser beam generator;
    a condensing lens located at said guide means for collecting said laser beam and applying said laser beam to a workpiece at a portion of the workpiece to be hardened;

an oscillating beam scanning means for oscillating a track of said laser beam over said workpiece with a predetermined amplitude;

a temperature detecting means for detecting a temperature of said portion to be hardened;

a target laser beam output computing means for computing a target laser beam output power from a difference between said temperature detected on said portion to be hardened and a predetermined hardening temperature, wherein the temperature detected on the portion and the target laser beam output power are for corresponding phase positions of sinusoidal cycles of the oscillating track of the laser beam; and a laser beam output controlling means for adjusting a power output of said laser beam generator, wherein the output controlling means controls the power output of said laser beam generator to the target laser beam output power when the beam scanning means is oscillating the track of said laser beam at a same phase position, in a subsequent scanning cycle, as a phase position at which said temperature was detected on said portion during a previous scanning cycle for determining the target laser beam output power.

7. A laser beam hardening device, comprising:

a laser beam generator;

a guide means for guiding a laser beam produced by the laser beam generator;

a condensing lens located at said guide means for collecting said laser beam and irradiating a workpiece with said laser beam at a portion of the workpiece to be hardened;

an oscillating beam scanning drive for oscillating a track of said laser beam over said portion of the workpiece, the track being scanned with a predetermined scanning amplitude, such that the laser beam follows a scanning track encompassing an area having a length over which the beam is scanned over a period and width equal to the scanning amplitude;

a beam splitter provided in said guide means between said laser beam generator and said condensing lens for sorting reflecting light reflected from said portion to be hardened, whereby the beam splitter collects the reflected light from a point on said portion to be hardened, which point follows along the scanning track; and a temperature measuring means provided at said beam splitter for measuring temperature of said portion to be hardened from said reflecting light sorted by said beam splitter.

8. The laser beam hardening device of claim 7, wherein the oscillating beam scanning drive is provided between said beam splitter and said condensing lens.

9. The laser beam hardening device of claim 7, wherein said temperature measuring means comprises an infrared thermometer.

10. The laser beam hardening device of claim 7, wherein said condensing lens is mounted to the guide means such that the condensing lens is relatively movable and drivable in a three-dimensional direction relative to said workpiece.

11. A laser beam hardening device, comprising:

a laser beam generator;

a guide unit for guiding a laser beam produced by said laser beam generator;

a condensing lens located at said guide unit for collecting said laser beam and applying said laser beam to a workpiece at a portion of the workpiece to be hardened;

an oscillating beam scanning unit for oscillating a track of said laser beam over said workpiece in successive scanning cycles having a spatial amplitude;

a temperature detecting unit for detecting temperature of said portion to be hardened;

a target laser beam output computing unit operable for computing a target laser beam output power from a difference between said temperature detected on said portion to be hardened and a predetermined hardening temperature, wherein the temperature detected on the portion and the target laser beam output power are for corresponding phase positions in cycles of the oscillating track of said laser beam; and a laser beam output controlling unit operable for adjusting a power output level of said laser beam generator, wherein the output controlling unit controls the power output level of said laser beam generator to seek the target laser beam output power when the oscillating beam scanning unit is at a same phase position, in a subsequent one of said scanning cycles, as a phase position at which said temperature was detected on said portion during a previous one of said scanning cycles.

12. A laser beam hardening device, comprising:

a laser beam generator;

a guide unit for guiding a laser beam produced by the laser beam generator;

a condensing lens located at said guide unit for collecting said laser beam and irradiating a workpiece with said laser beam at a portion of the workpiece to be hardened;

an oscillating beam scanning drive for oscillating a track of said laser beam over said portion of the workpiece, the track being scanned with a predetermined scanning amplitude, such that the laser beam follows a scanning track encompassing an area having a length over which the beam is scanned over a period and width equal to the scanning amplitude;

a beam splitter provided in said guide unit between said laser beam generator and said condensing lens for sorting reflecting light reflected from said portion to be hardened, whereby the beam splitter collects the reflected light from a point on said portion to be hardened, which point follows along the scanning track; and a temperature measuring unit provided at said beam splitter for measuring temperature of said portion to be hardened from said reflecting light sorted by said beam splitter.

13. The laser beam hardening device of claim 12, wherein the beam oscillating scanning drive is disposed between said beam splitter and said condensing lens.

14. The laser beam hardening device of claim 12, wherein said temperature measuring unit comprises an infrared thermometer.

15. A laser beam hardening device, having a laser beam generator, a guide means for guiding a laser beam produced by said laser beam generator and a condensing lens located at said guide means, for collecting said laser beam and applying said laser beam to a workpiece at a portion of said workpiece to be hardened, comprising:

an oscillating beam scanning means for oscillating said laser beam with a predetermined scanning amplitude;

said laser beam hardening device being said laser beam hardening device for hardening of a workpiece with a laser beam by executing a plurality of hardening cycles, said hardening cycles being formed with a track of said laser beam made by irradiating said workpiece with said laser beam, oscillating said laser beam with a predetermined scanning amplitude by said oscillating beam scanning means;

further comprising a temperature detecting means for detecting a temperature of said portion of said workpiece to be hardened;

a target laser beam output computing means for dividing said hardening cycle by a predetermined sampling time, detecting a temperature of a portion of said workpiece to be hardened at each point of said sampling time through said temperature detecting means, and obtaining a target laser beam output of a laser beam generator from a difference between said temperature detected on said portion to be hardened and a predetermined hardening temperature in order to make said temperature detected on said portion to be hardened a predetermined hardening temperature determined in advance by a hardening program; and, a laser beam output control means for instructing a laser beam generator control portion connected with said laser beam generator to make said output of said laser beam generator said target laser beam output at a same phase position as a sampling position, in said hardening cycle which is at least one cycle after said hardening cycle on which said temperature of said portion of said workpiece to be hardened was detected, at a predetermined time before reacting said same phase position.

16. A laser beam hardening device, having a laser beam generator, a guide unit for guiding a laser beam produced by said laser beam generator and a condensing lens located at said guide unit, for collecting said laser beam and applying said laser beam to a workpiece at a portion of said workpiece to be hardened, comprising:

an oscillating beam scanning unit for oscillating said laser beam with a predetermined scanning amplitude;

said laser beam hardening device being said laser beam hardening device for hardening of a workpiece with a laser beam by executing a plurality of hardening cycles, said hardening cycles being formed with a track of said laser beam made by irradiating said workpiece with said laser beam, oscillating said laser beam with a predetermined scanning amplitude by said oscillating beam scanning unit;

further comprising a temperature detecting unit for detecting a temperature of said portion of said workpiece to be hardened;

a target laser beam output computing unit for dividing said hardening cycle by a predetermined sampling time, detecting a temperature of a portion of said workpiece to be hardened at each point of said sampling time through said temperature detecting unit, and obtaining a target laser beam output of a laser beam generator from a difference between said temperature detected on said portion to be hardened and a predetermined hardening temperature in order to make said temperature detected on said portion to be hardened a predetermined hardening temperature determined in advance by a hardening program; and a laser beam output control unit for instructing a laser beam generator control portion connected with said laser beam generator to make said output of said laser beam generator said target laser beam output at a same phase position as a sampling position, in said hardening cycle which is at least one cycle after said hardening cycle on which said temperature of said portion of said workpiece to be hardened was detected, at a predetermined time before reaching said same phase position.

* * * * *